(12) United States Patent
Evans, Jr. et al.

(10) Patent No.: US 8,903,061 B2
(45) Date of Patent: *Dec. 2, 2014

(54) STORAGE, PROCESSING, AND DISPLAY OF SERVICE DESK PERFORMANCE METRICS

(71) Applicant: Hartford Fire Insurance Company, Hartford, CT (US)

(72) Inventors: Robert Louis Evans, Jr., San Antonio, TX (US); Jared Allen Steele, Cromwell, CT (US); Matthew Dale Wagster, Converse, TX (US); Jack Carlos Zaldivar, Jr., Mico, TX (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,196

(22) Filed: May 6, 2013

(65) Prior Publication Data

US 2013/0235999 A1 Sep. 12, 2013

Related U.S. Application Data

(63) Continuation of application No. 12/887,264, filed on Sep. 21, 2010, now Pat. No. 8,462,922.

(51) Int. Cl.
*H04M 15/00* (2006.01)
*H04M 3/00* (2006.01)
*H04M 3/51* (2006.01)

(52) U.S. Cl.
CPC ...... *H04M 3/5175* (2013.01); *H04M 2203/558* (2013.01); *H04M 2203/555* (2013.01)
USPC ................. 379/112.06; 379/265.06

(58) Field of Classification Search
USPC .......................... 379/112.06, 265.03, 265.06
See application file for complete search history.

(56) References Cited

U.S. PATENT DOCUMENTS

| 6,110,228 A | 8/2000 | Albright et al. |
| 6,289,378 B1 | 9/2001 | Meyer et al. |

(Continued)

FOREIGN PATENT DOCUMENTS

| WO | 0244867 A2 | 6/2002 |
| WO | 2004104734 A2 | 12/2004 |

OTHER PUBLICATIONS

Nice IEX Workforce Management; A comprehensive workforce management solution for improving the efficiency and effectiveness of your business; Available at: www.nice.com Oct. 27, 2010.

(Continued)

*Primary Examiner* — Quoc D Tran
(74) *Attorney, Agent, or Firm* — Volpe and Koenig, P.C.

(57) ABSTRACT

An architecture for the storage, processing, and display of service desk performance metrics data for a service desk department may include a call management system (CMS), an issue tracking system, a performance metrics (PM) database, a PM database module, a PM display data module, and a PM client module. The PM database module may retrieve call statistics data from the call management system database and issue tracking data from the issue tracking system database, and store the data in the PM database. The PM client module may obtain call statistics data and issue tracking data from the PM database via the PM display data module. The PM client module may display the obtained call statistics data and issue tracking data in one or more user interface elements.

20 Claims, 6 Drawing Sheets

(56) References Cited

U.S. PATENT DOCUMENTS

| | | |
|---|---|---|
| 6,324,659 B1 | 11/2001 | Pierro |
| 6,603,854 B1 | 8/2003 | Judkins et al. |
| 6,707,904 B1 | 3/2004 | Judkins et al. |
| 6,769,118 B2 | 7/2004 | Garrison et al. |
| 6,782,093 B2 | 8/2004 | Uckun |
| 6,871,232 B2 | 3/2005 | Curie et al. |
| 6,907,551 B2 | 6/2005 | Katagiri et al. |
| 6,944,858 B2 | 9/2005 | Luu |
| 6,947,989 B2 | 9/2005 | Gullotta et al. |
| 7,024,474 B2 | 4/2006 | Clubb et al. |
| 7,120,589 B1 | 10/2006 | Szabo et al. |
| 7,281,170 B2 | 10/2007 | Taylor et al. |
| 7,302,397 B1 | 11/2007 | Hein et al. |
| 7,357,301 B1 | 4/2008 | Bajpay et al. |
| 7,376,570 B2 | 5/2008 | Sone |
| 7,676,672 B2 | 3/2010 | Phillips et al. |
| 7,685,595 B1 | 3/2010 | Manahan et al. |
| 7,698,162 B2 | 4/2010 | Vaccarelli et al. |
| 7,711,653 B1 | 5/2010 | Denham et al. |
| 7,734,496 B1 | 6/2010 | Crandon et al. |
| 7,873,156 B1 | 1/2011 | Blair |
| 8,112,298 B2 * | 2/2012 | Bourne et al. ............... 705/7.13 |
| 8,364,509 B1 * | 1/2013 | Marr ............................ 705/7.11 |
| 8,462,922 B2 * | 6/2013 | Evans et al. ............... 379/112.06 |
| 2001/0056572 A1 | 12/2001 | Richard et al. |
| 2002/0123925 A1 | 9/2002 | Smith |
| 2002/0123983 A1 | 9/2002 | Riley et al. |
| 2002/0184041 A1 | 12/2002 | Muller |
| 2003/0101088 A1 | 5/2003 | Lohavichan |
| 2005/0010461 A1 | 1/2005 | Manos |
| 2005/0060397 A1 | 3/2005 | Barthram et al. |
| 2005/0108708 A1 | 5/2005 | Im |
| 2005/0160142 A1 | 7/2005 | Whitman, Jr. |
| 2005/0172170 A1 | 8/2005 | Thieret et al. |
| 2006/0026049 A1 | 2/2006 | Joseph et al. |
| 2006/0203991 A1 | 9/2006 | Kramer et al. |
| 2007/0025535 A1 | 2/2007 | Bushey et al. |
| 2007/0073699 A1 | 3/2007 | Reed |
| 2007/0100936 A1 | 5/2007 | Lum |
| 2007/0156846 A1 | 7/2007 | Seward |
| 2007/0230682 A1 | 10/2007 | Meghan et al. |
| 2008/0059267 A1 | 3/2008 | Hamilton et al. |
| 2008/0240404 A1 | 10/2008 | Conway et al. |
| 2009/0245493 A1 * | 10/2009 | Chen et al. ............... 379/112.06 |
| 2009/0249215 A1 | 10/2009 | Paek |
| 2010/0023933 A1 | 1/2010 | Bryant et al. |
| 2010/0031095 A1 | 2/2010 | Ruan et al. |
| 2010/0038416 A1 | 2/2010 | Canora |
| 2010/0042468 A1 | 2/2010 | Doan et al. |

OTHER PUBLICATIONS

Nice IEX Workforce Management Advanced; The Nice IEX Workforce Management Advanced and Optional modules help contact centers enhance operational efficiency and effectiveness; Available at: www.nice.com Oct. 27, 2010.

* cited by examiner

FIG. 1

| Agent 6 | 20 | 10 | 20 | 2 | 10% | 3:00 | 30% | 5:00 | 1 | 1 | 29:00 |

Data Last Updated: 08/05/2010 10:00 AM EST

| Analyst Name | Calls Answered | Calls Per Hour | Tickets Submitted | Tickets Resolved | % Resolved | Avg. Talk Time | Availability | Break Time | Agent Follow Up | Personal | Total ACW |
|---|---|---|---|---|---|---|---|---|---|---|---|
| *Team Leader One* | | | | | | | | | | | |
| Agent 1 | 30 | 15 | 0 | 0 | 0% | 5:00 | 10% | 15 | 4 | 1 | 20:00 |
| Agent 2 | 20 | 10 | 0 | 0 | 0% | 4:00 | 70% | 40:00 | 3 | 5 | 35:00 |
| Agent 3 | 40 | 20 | 10 | 0 | 0% | 3:00 | 20% | 34:00 | 2 | 2 | 21:00 |
| Agent 4 | 60 | 30 | 10 | 10 | 80% | 1:30 | 60% | 15:00 | 3 | 2 | 28:00 |
| Agent 5 | 40 | 20 | 20 | 10 | 50% | 1:30 | 50% | 26:00 | 5 | 1 | 26:00 |
| Agent 6 | 20 | 10 | 20 | 2 | 10% | 3:00 | 30% | 5:00 | 1 | 1 | 29:00 |
| Team Avg. | 35 | 17.5 | 10 | 2 | 10% | 2:00 | 40% | 22:30 | 3 | 2 | 26:30 |
| *Team Leader Two* | | | | | | | | | | | |
| Agent 7 | 20 | 10 | 4 | 2 | 50% | 4:00 | 55% | 10:00 | 1 | 1 | 35:00 |
| Agent 8 | 40 | 20 | 5 | 1 | 20% | 3:30 | 45% | 10:00 | 0 | 3 | 20:30 |
| Agent 9 | 10 | 5 | 5 | 3 | 60% | 3:30 | 60% | 15:00 | 1 | 2 | 15:00 |
| Agent 10 | 30 | 15 | 12 | 6 | 50% | 1:30 | 50% | 5:00 | 3 | 1 | 4:30 |
| Agent 11 | 10 | 5 | 14 | 7 | 50% | 3:30 | 40% | 0:00 | 1 | 4 | 30:00 |
| Team Avg. | 22 | 11 | 8 | 3.8 | 46% | 3:00 | 50% | 8:00 | 1.2 | 2.2 | 21 |

*FIG. 2*

Performance Metrics for Time Period of 08/01/2010 to 08/13/2010

| Analyst Name | Total Calls Answered | Avg. Calls Answered | Total Tickets Submitted | Avg. Tickets Submitted | Total Status Tickets | Avg. Status Tickets | % Tickets Opened | Total Tickets Resolved | Avg. Tickets Resolved | % Tickets Resolved | Avg. Talk Time | Avail-ability |
|---|---|---|---|---|---|---|---|---|---|---|---|---|
| Agent 1 | 439 | 37 | 404 | 34 | 68 | 6 | 92% | 219 | 18 | 53% | 07:16 | 65% |
| Agent 2 | 521 | 40 | 488 | 38 | 51 | 4 | 95% | 282 | 22 | 58% | 05:27 | 61% |
| Agent 3 | 437 | 49 | 384 | 42 | 59 | 7 | 88% | 245 | 27 | 63% | 06:15 | 75% |
| Agent 4 | 0 | 1 | 9 | 2 | 0 | 0 | 0% | 60 | 10 | 0% | 00:00 | 0% |
| Agent 5 | 408 | 47 | 515 | 47 | 42 | 4 | 10% | 307 | 28 | 62% | 06:21 | 58% |
| Agent 6 | 0 | 1 | 10 | 1 | 0 | 0 | 100% | 54 | 7 | 0% | 00:00 | 0% |
| Agent 7 | 539 | 45 | 477 | 40 | 69 | 6 | 89% | 299 | 25 | 63% | 04:09 | 63% |
| Agent 8 | 0 | 1 | 3 | 2 | 0 | 0 | 100% | 12 | 6 | 59% | 00:00 | 0% |
| Agent 9 | 285 | 22 | 249 | 19 | 47 | 4 | 86% | 156 | 12 | 62% | 08:08 | 86% |
| Agent 10 | 741 | 49 | 730 | 49 | 58 | 4 | 100% | 429 | 29 | 0% | 05:26 | 69% |
| Agent 11 | 668 | 45 | 590 | 39 | 87 | 6 | 87% | 355 | 24 | 64% | 05:49 | 73% |
| Total | 4038 | 337 | 3859 | 313 | 481 | 41 | N/A | 2418 | 208 | N/A | N/A | N/A |
| Average | 367 | 30 | 351 | 29 | 44 | 4 | 80% | 220 | 19 | 40% | 04:26 | 50% |

STORAGE, PROCESSING, AND DISPLAY OF SERVICE DESK PERFORMANCE METRICS

CROSS REFERENCE TO RELATED APPLICATION

This application is a continuation of U.S. patent application Ser. No. 12/887,264, filed Sep. 21, 2010, which is incorporated by reference as if fully set forth.

TECHNICAL FIELD

The subject matter disclosed herein relates to the electronic storage, processing, and display of data that represents service desk performance metrics.

BACKGROUND

Many organizations have a service desk department that provides support to customers or employees. The services offered by a service desk department may vary depending whether the service desk department is inward-facing (serving workers of the organization) or outward-facing (serving outside customers of the organization), and depending on the purpose of the service desk department within its larger organization. For example, a service desk department may provide support for its organization's Information Technology (IT) infrastructure. When a worker in the organization has an issue using her computer, the worker may call the service desk department to report the issue.

The benefits of a service desk department are particularly vital to organizations such as insurance providers and financial services organizations. Such organizations may have employees at a central home office, as well as employees located in satellite offices throughout the United States and the world, and so may operate around the clock. These organizations are expected to provide a high level of service to their customers. To provide a high level of service, these organizations rely on the expertise of their service desk departments to ensure that the infrastructure supporting their employees is functional and effective.

A service desk department may use a number of different technologies to help manage and perform service desk functions. For example, a service desk department may use a call management system (CMS) to route incoming support calls to the service desk agents that work in the service desk department. A CMS may route calls based on call volume, relative business of different service desk agents, different areas of expertise of service desk agents, or other factors. A CMS may also store information related to incoming calls in a call database. The stored information may include, for example, the time of a call, the length of a call, the customer who placed the call, which service desk agent received the call, or other information.

A service desk department may also use an issue tracking system to manage workflow and keep track of reported service outages and service requests. When a user contacts the service desk department to report an issue, the agent handling the issue will open a new entry (in many systems referred to as a "ticket") in the issue tracking system. The agent may then add additional data related to the issue to the ticket, such as the level of urgency of the issue, the users affected by the issue, or a detailed description of the issue. The ticket may then be assigned to a service desk agent to be resolved. When the assigned service desk agent performs work on the issue, the ticket is updated to reflect the agent's progress. When an issue has been resolved, the ticket may be updated to indicate that it has been resolved.

To ensure that a service desk department is performing as well as it should, technologies are required to present information about performance statistics to supervisors that manage service desk agents, as well as to the agents themselves. For example, a service level agreement (SLA) may require that a service desk department answer calls within a given period of time, or that issues must be resolved within a given period of time. It is advantageous for supervisors to be able to view data such as call answer times and issue resolution times, so that they may assess whether agents on their team are regularly meeting the SLA or not. Similarly, if agents are able to monitor their own performance, they may be able to determine areas in which they may be able to improve their work habits. Therefore, new technologies are required that effectively display service desk performance metrics for use by service desk supervisors and agents.

SUMMARY

A system for use by a service desk department in an insurance or financial services company includes at least one communications interface, at least one processor, and a display device. The at least one communications interface may be configured to receive call statistics data from a call management system (CMS) database, wherein the call statistics data includes data for each of a plurality of service desk agents for a given time period. The at least one communications interface may be further configured to receive service desk issue data from an issue tracking system database, wherein the service desk issue data includes data for each of the plurality of service desk agents for the given time period. The call statistics data and the service desk issue data may relate to interruptions in service for one or more systems related to submitting insurance claims, processing insurance claims, performing stock trades, maintaining compliance with insurance laws, or maintaining compliance with Securities and Exchange Commission (SEC) regulations. The at least one processor may be configured to store the call statistics data and the service desk issue data in a performance metrics database, and to call statistics data and service desk issue data from the performance metrics database. The display device may be configured to display a user interface element. The user interface element may include, for each of the plurality of service desk agents: at least one area for displaying the call statistics data obtained from the performance metrics database that corresponds to the service desk agent, and at least one area for displaying the service desk issue data obtained from the performance metrics database that corresponds to the service desk agent.

A computer-implemented method for displaying service desk performance metrics includes receiving call statistics data from a CMS database, wherein the call statistics data includes data for each of a plurality of service desk agents for a given time period, and receiving service desk issue data from an issue tracking system database, wherein the service desk issue data includes data for each of the plurality of service desk agents for the given time period. The method may further include storing the call statistics data and the service desk issue data in a performance metrics database and obtaining call statistics data and service desk issue data from the performance metrics database. The method may further include displaying a user interface element, wherein the user interface element includes, for each of the plurality of service desk agents at least one area for displaying the call statistics data obtained from the performance metrics database that corresponds to the service desk agent; and at least one area for displaying the service desk issue data obtained from the performance metrics database that corresponds to the service desk agent.

A system for displaying service desk performance metrics includes at least one communications interface, at least one processor, and a display device. The at least one communications interface may be configured to receive call statistics data from a call management system (CMS) database, wherein the call statistics data includes data for each of a plurality of service desk agents for a given time period. The at least one communications interface may be further configured to receive service desk issue data from an issue tracking system database, wherein the service desk issue data includes data for each of the plurality of service desk agents for the given time period. The at least one processor may be configured to store the call statistics data and the service desk issue data in a performance metrics database, and to call statistics data and service desk issue data from the performance metrics database. The display device may be configured to display a user interface element. The user interface element may include, for each of the plurality of service desk agents: at least one area for displaying the call statistics data obtained from the performance metrics database that corresponds to the service desk agent, and at least one area for displaying the service desk issue data obtained from the performance metrics database that corresponds to the service desk agent.

A computer-readable medium has processor-executable instructions stored thereon which, when executed by at least one processor, will cause the at least one processor to perform a method for displaying service desk performance metrics. The method may include receiving call statistics data from a CMS database, wherein the call statistics data includes data for each of a plurality of service desk agents for a given time period, and receiving service desk issue data from an issue tracking system database, wherein the service desk issue data includes data for each of the plurality of service desk agents for the given time period. The method may further include storing the call statistics data and the service desk issue data in a performance metrics database and obtaining call statistics data and service desk issue data from the performance metrics database. The method may further include displaying a user interface element, wherein the user interface element includes, for each of the plurality of service desk agents: at least one area for displaying the call statistics data obtained from the performance metrics database that corresponds to the service desk agent, and at least one area for displaying the service desk issue data obtained from the performance metrics database that corresponds to the service desk agent.

BRIEF DESCRIPTION OF THE DRAWINGS

A more detailed understanding may be had from the following description, given by way of example in conjunction with the accompanying drawings wherein.

DETAILED DESCRIPTION

Figure 1:
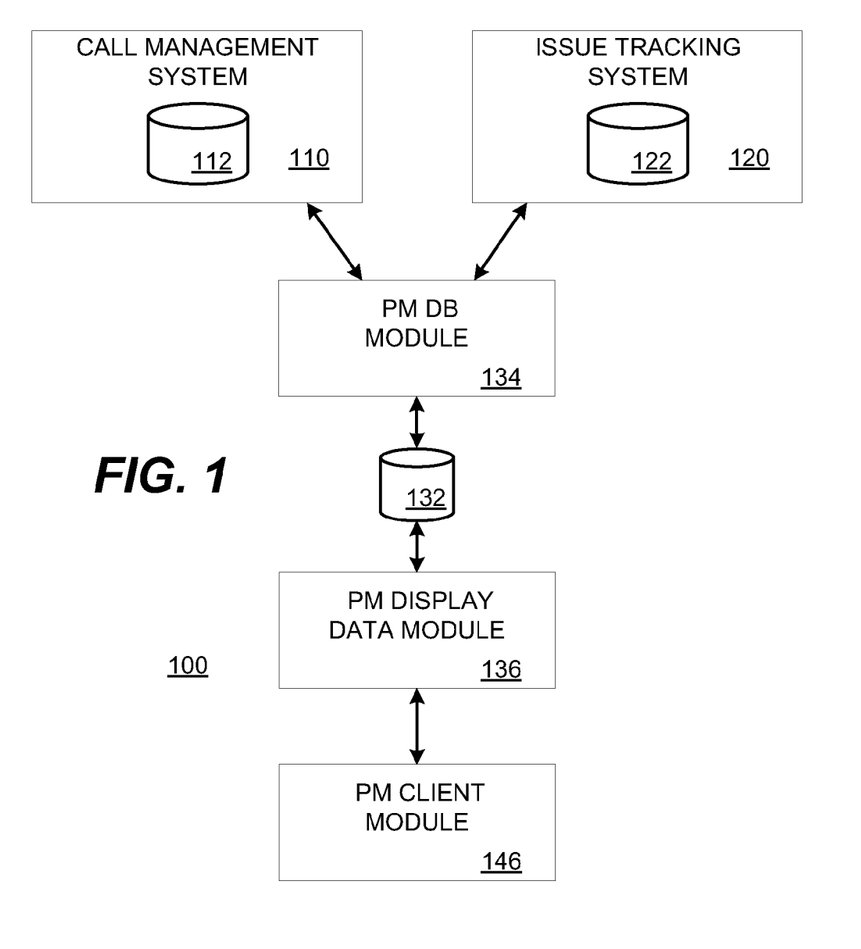
FIG. 1 shows an example architecture for the storage, processing, and display of service desk performance metrics data for a service desk department.

FIG. 1 shows an example architecture 100 for the storage, processing, and display of service desk performance metrics data for a service desk department. The example architecture 100 includes a call management system (CMS) 110, a CMS database 112, an issue tracking system 120, an issue tracking system database 122, a PM database module 134, a performance metrics (PM) database 132, a PM display data module 136, and a PM client module 146.

The CMS 110 includes a call management system database 112. The CMS 110 may implement functionality for a service desk department such as automatic call routing and the storage of data that describes the calls placed by and/or received by service desk agents. The data may include attributes such as the time and duration for each call placed via the CMS 110 and identifiers of the parties (e.g., the user/customer and the service desk agent) making and receiving the call. The CMS 110 may also monitor and store, on a per-agent basis, the number of calls answered, the average call duration (or "average talk time"), the times during which an agent is available, the times during which an agent is on a break, a number of open service desk tickets that have been personally assigned to the service desk agent, the number of redirect on no answer (RONA) calls placed to an agent, the total After Call Work (ACW) time for an agent, and/or other metrics. The CMS 110 may store the above-described data regarding call attributes and agent telephone usage in the CMS database 112.

The issue tracking system 120 may be used by a service desk department to record information about and track reported incidents and service requests. The issue tracking system 120 may store a "ticket" per reported incident or service request. The ticket may include data such as the time the ticket was opened, the user/customer who initiated the ticket, the service desk agent who opened the ticket, the service desk agent who is assigned to resolve the ticket, a current status of the ticket, historical data regarding efforts made to resolve the ticket, or other data. The issue tracking system 120 may store this data in the issue tracking system database 122. The issue tracking system 120 may include a web server (not depicted) or other server (not depicted) that provides an interface for adding new tickets, modifying ticket information, and/or viewing ticket information.

The issue tracking system 120 may be used by a service desk department to handle a variety of different issues. The issues may include, for example, incidents or service requests related to software, hardware, or other infrastructure. As one example, the issue tracking system 120 may be used by an internal-facing service desk department in an insurance and investment company. In this example, employees of the insurance and investment company may contact the service desk department when they encounter issues with the systems that they use to submit insurance claims for customers, process insurance claims, perform stock trades, maintain compliance with insurance laws, or maintain compliance with Securities and Exchange Commission (SEC) regulation.

The PM database module 134 may retrieve data from the CMS database 112 and the issue tracking system database 122, and may store the data in the PM database 132. The PM database module 134 may retrieve and store any of the types of data mentioned above as stored in the CMS database 112 and/or the issue tracking system database 122. The PM database 132 may also include data related to personal time used (PTU) and the amount and type of training that service desk agents have received. This data may be added by the PM database module 134 after obtaining it from one or more other databases (not depicted), such as a human resources or personnel management database. The PM database module 134 may be configured to retrieve data from CMS database 112 and/or the issue tracking system database 122 on a periodic basis, such as every five minutes, every ten minutes, once per hour, or at any other periodicity. Alternatively or additionally, any of the types of data mentioned above may be added to the PM database 132 via manual input from users.

The PM display data module 136 may provide data from the PM database 132 to the PM client module 146. The PM client module 146 may display the received data using a display device (not depicted). The PM display data module 136 and PM client module 146 may be implemented using a number of different technologies. For example, the PM display data module 136 may be a web server that includes or is connected to a server-side scripting engine, and the PM client module 146 may be a web browser or similar application. In such an instance, the PM client module 146 may send Hyper Text Transfer Protocol (HTTP) requests to the PM display data module 136. The PM display data module 136 may receive the requests, obtain data from the PM database 132, and return web pages PM client module 146 (described using, e.g., Hyper Text Markup Language (HTML)) that include the obtained data. Appropriate server-side scripting technologies for this purpose may include, for example, Active Server Pages (ASP), PHP: Hypertext Preprocessor (PHP), or Ruby on Rails (RoR).

Alternatively, the PM client module 146 may be a client application related to the display of database reports, such as Microsoft Access client application. In such an instance, the PM client module 146 may send report queries to the PM display data module 136, which may obtain the requested data from the PM database 132 and return the data to the PM client module 146 for display.

In a variation on the architecture 100 of FIG. 1, the PM client module 146 may obtain data directly from the PM database 132, without the use of a module such as the PM display data module 136. This may be performed, for example, by accessing the PM database 132 through a local or networked file system. Examples of appropriate file systems include, for example, file systems based on Server Message Block (SMB), NetWare Core Protocol (NCP), or Network File System (NFS) technology.

Each of the modules 134, 136, 146 shown in FIG. 1 may be implemented as software modules, as specific-purpose processors, or as combinations thereof. When implemented as software, a module 134, 136, 146 may be implemented as an executable program, an executable application, a function, a method call, a procedure, a routine or sub-routine, a set of processor-executable instructions, a script or macro, an object, a data structure, or any other appropriate software construct.

The architecture 100 of FIG. 1 may be implemented using a number of different network topologies and computing devices. For example, each of the CMS 110, CMS database 112, issue tracking system 120, issue tracking system database 122, PM database 132, PM database module 134, PM display data module 136, and PM client module 146 may be implemented using a single computing device, as one or more separate computing devices, or spread across any two or more computing devices, in any combination. When spread across two or more computing devices, wired or wireless networking may be used for communication between these entities 110, 112, 120, 122, 132, 134, 136, 146. Wired or wireless network may involve the use of technologies such as but not limited to Transmission Control Protocol (TCP), User Datagram Protocol, Internet Protocol (IP), Ethernet, Digital Subscriber Line (DSL), Wireless Local Area Network (WLAN), wireless cellular technology, and/or any other appropriate technology related to wired or wireless communications. An example of a computing device that may be used for the implementation of any or any combination of these entities 110, 112, 120, 122, 132, 134, 136, 146 is the computing device 700 that is described below with reference to FIG. 7.

Figure 2:
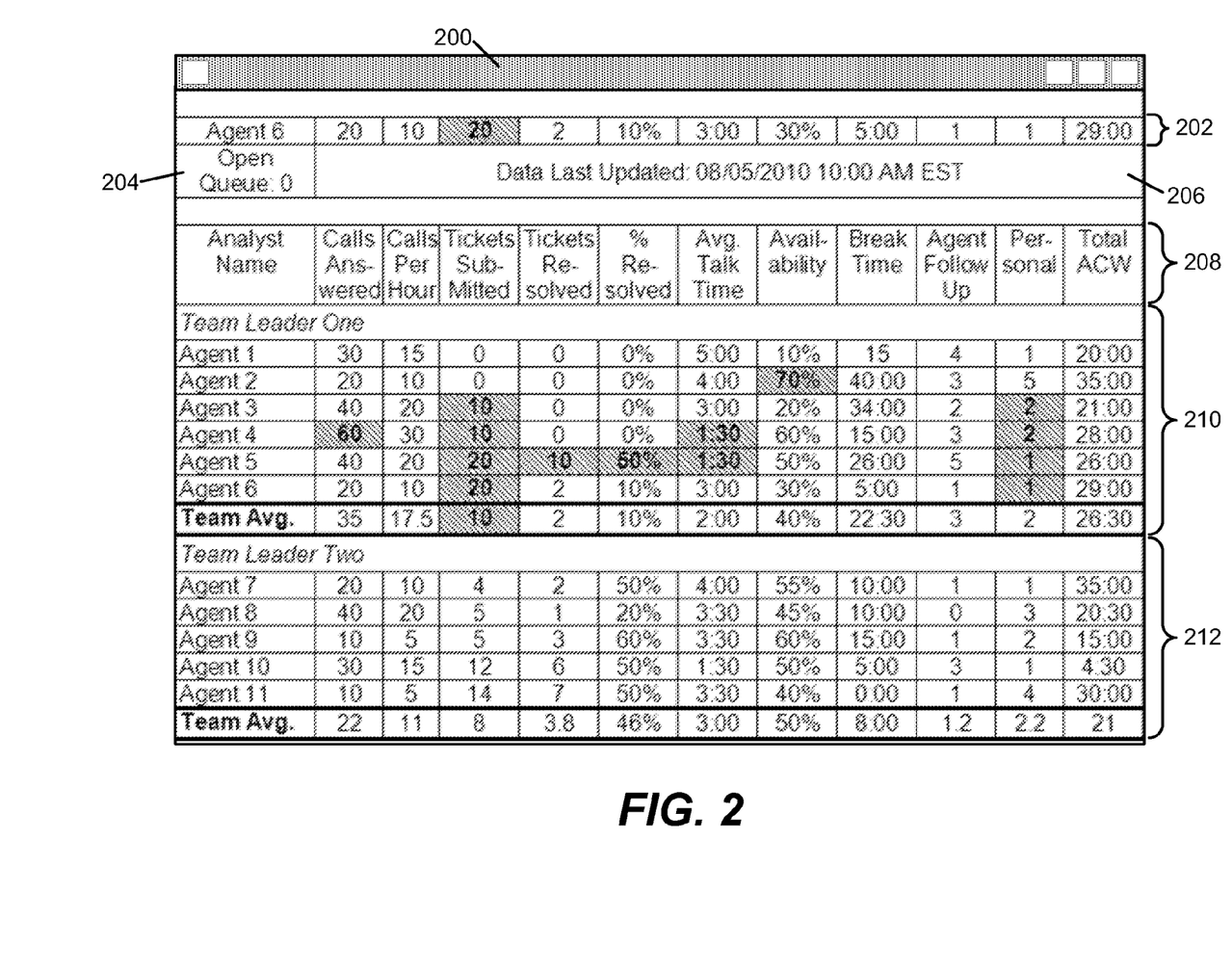
FIG. 2 shows a performance metrics display element that includes performance metrics data for service desk agents over the course of a given day or shift.

FIG. 2 shows a performance metrics display element 200 that may be displayed by the PM client module 146 of FIG. 1. In various implementations, the PM client module 146 may obtain the data displayed in the performance metrics display element 200 from PM database 132 via the PM display data module 136, or directly from the PM database 132. The performance metrics display element 200 may be used to show performance metrics data for service desk agents over the course of a given day or shift. The PM client module 146 may obtain the data displayed in the performance metrics display element from the PM database 132 via the PM display data module 136. The performance metrics display element 200 includes a highlighted agent 202, an open queue area 204, a data last updated area 206, a header row area 208, a first table area 210, and a second table area 212.

The first table area 210 and second table area 212 display service desk performance metrics related to two different teams of service desk agents for a given day. The header row area 208 describes the types of data that are included in the first table area 210 and the second table area 212. As shown in FIG. 2, the first table area 210 and second table area 212 display service desk performance metrics on a per-agent basis. The performance metrics shown in the first table area 210 and the second table area 212 may include metrics related to data stored in the CMS database 112 of FIG. 1, such as calls answered, calls per hour, average talk time, percentage of time available, break time, a number of open service desk tickets that have been personally assigned to the service desk agent, personal calls, and total ACW. The performance metrics shown in the first table area 210 and the second table area 212 may also include metrics related to data stored in the issue tracking system database 122, such as a number of tickets submitted, a number of tickets resolved, a percentage of tickets resolved, a number of tickets that require agent follow up, and a number of tickets assigned to an agent that have not been updated in a given time period (such as an hour, a shift, three days, or some other time period).

The data displayed in the performance metrics display element 200 may be periodically configured to update or refresh so as to include current data. The performance metrics display element 200 may be updated in real time, every five minutes, every ten minutes, once per hour, or at any other periodicity. Alternatively or additionally, the user interface element may update in response to input from a user. The last update time area 206 may indicate the last time the performance metrics display element 200 was updated. Alternatively, the last update time area 206 may indicate the last time that the PM database module 134 obtained updated data from the CMS database 112 and/or the issue tracking system database 122.

The highlighted agent area 202 shows performance metrics data for a particular service desk agent. Performance metrics data for the service desk agent may also be shown in the first table area 210 and/or second table area 212. The agent whose data is selected to be shown in the highlighted agent area 202 may be determined in a number of different ways. For example, the row corresponding to an agent may be selected in the first table area 210 or the second table area 212; in response to the selection, the highlighted agent area 202 may be configured to show data corresponding to the selected row. Alternatively or additionally, if the PM client module 146 includes login functionality, the highlighted agent area 202 may be set by default to indicate data related to a service desk agent that has logged in to and is using the PM client module 146. The open queue area 204 may indicate the number of open tickets that are assigned to the service desk department for which the particular service desk agent works. Alternatively, the open queue area 204 may indicate the number of open tickets that are assigned to the particular service desk agent.

In the first table area 210 and the highlighted agent area 202, the display of a user interface element that represents a performance metric value may be changed based on the level of performance reflected by the value. For example, first table area 210 includes a Calls Answered column, which indicates a number of calls answered by six service desk agents. In this example, Agent Four has a Calls Answered value of sixty. The remaining agents have values for this metric that are at forty or below. A goal in this service desk department may be that agents should answer more than fifty calls per shift. A threshold that reflects this goal may be configured in the first table area 210, such that the cells in the first table area 60 that correspond to a Calls Answered value over fifty will be rendered differently than cells that correspond to a Calls Answered value of fifty or below. This is shown in the first table area 60, in that Agent Four's cell in the Calls Answered has a different visual appearance than the cells for the other agents. Further to this example, the first table area 60 also shows that agents have met or are meeting performance goals in the Tickets Submitted, Tickets Resolved, Average Talk Time, Availability, and Personal columns.

The display of user interface elements to reflect a level of performance may be implemented in a number of different ways. For example, the text in an element may be colored in a first color (e.g., green) to indicate an acceptable level of performance, and colored in a second color (e.g., red) to indicate an unacceptable level of performance. Alternatively or additionally, different fonts, highlighting, background coloring, and/or other approaches may be used to show the level of performance indicated by a value. The different fonts, highlighting, background color, and/or other approaches may be applied in a graduated fashion, in accordance with a performance metrics rating system used by a service desk department. For example, a service desk department may rank values for different performance metrics on a graduated one-to-five scale, where a value of one indicates the highest level of performance and a value of five indicates the lowest level of performance. A first color (e.g., green) may be selected to be used for performance metrics values that correspond to values of one through three on the scale; a second color (e.g., red) may be selected to indicate a value of four to five on the scale. Alternatively, a first color (e.g., green) may be selected to be used for performance metrics values that correspond to a value of one on the scale; a second color (e.g., red) may be selected to be used for performance metrics values that correspond to a value of five on the scale; and a third color (e.g., yellow) may be selected to be used for performance metrics values that correspond to values two through four on the scale.

The performance metrics display element 200 may also be configured to initiate the display of data from the issue tracking system 120. This may be performed, for example, based on a selection by a user of a user interface element within the performance metrics display element 200 that relates to the issue tracking system 120 and/or data from the issue tracking system database 122. As an example, a user may select a cell in the Tickets Submitted column in the first table area 210 or the second table area 212. The selection may be performed, for example, by the user clicking a mouse or providing an input via a different type of input device. In response to the selection, the PM client module 146 may initiate the display of information related to the selected tickets. In an instance where the PM client module 146 is implemented as a web browser, the user interface elements in the performance metrics display element 200 that relate to the issue tracking system 120 and/or from the issue tracking database may include hyperlinks. When the user selects a hyperlink, the PM client module 146 may open the hyperlink and the corresponding information from the issue tracking system 120 may be displayed. If the issue tracking system 120 includes a web interface, the information from the issue tracking system 120 may be displayed in a different window in the browser. Alternatively, selection of the hyperlink may initiate the display of the selected information in a dedicated client application that is specific to the issue tracking system.

Although not shown in FIG. 2, the second table area 212 may also be configured to change the display of user interface elements based on performance metric values, as described above with reference to the first table area 210. Although the performance metrics display element 200 of FIG. 2 includes two table areas to display data for two teams of service desk agents, the performance metrics display element 200 may be configured to display any number of similar table areas related to any number of teams of service desk agents.

Figure 3:
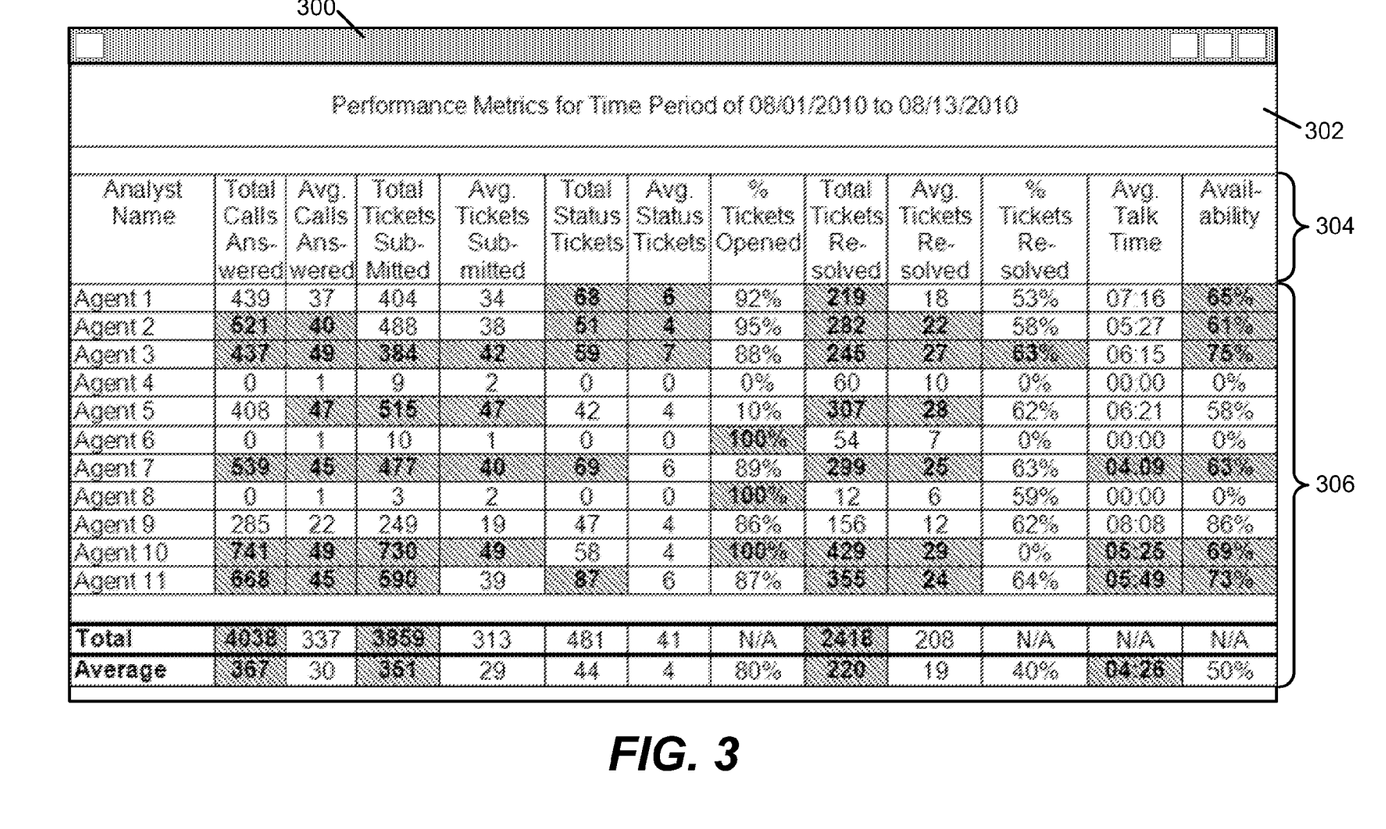
FIG. 3 shows a further performance metrics display element that includes past performance metrics data for a configured time period.

FIG. 3 shows a further performance metrics display element 300 that may be displayed by the PM client module 146 of FIG. 1. In various implementations, the PM client module 146 may obtain the data displayed in the performance metrics display element 300 from PM database 132 via the PM display data module 136, or directly from the PM database 132. As described in further detail below, the performance metrics display element 300 of FIG. 3 may be used to show past performance metrics data for a configured time period. The performance metrics display element 300 includes a time period area 302, a header row area 304, and a table area 306.

The time period area 302 indicates the time period for which performance metrics data is displayed in the performance metrics display element 300. As shown in the time period area 302, an example time period may be Aug. 1, 2010 through Aug. 13, 2010.

The table area 306 displays performance metrics related to service desk agents in a service desk department during the given time period. The header row area 304 describes the types of data that are included in the table area 306. The table area 306 displays service desk performance metrics on a per-agent basis. The performance metrics shown include data related to data stored in the CMS database 112 of FIG. 1 for the given time period, such as calls answered, average calls answered per hour, average talk time, and availability. The performance metrics shown also include data related to data stored in the issue tracking system database 122 for the given time period, such as a total number of tickets submitted, an average number of tickets submitted per workday or shift, a number of "status" tickets (i.e., the number of times the agent has entered a status update regarding a ticket into the issue tracking system 120), an average number of "status" tickets (i.e., the number average number of times the agent has entered a status update regarding a ticket into the issue tracking system 120 per workday or shift), a total number of tickets resolved, an average number of tickets resolved per workday or shift, and a percentage of tickets resolved. The table area 306 may display user interface elements differently based on the level of performance reflected by a performance metric, in a similar fashion to that described above with respect to the first table area 210 of FIG. 2.

Although the performance metrics display element 300 of FIG. 3 shows data for an example time period of Aug. 1, 2010 through Aug. 13, 2010, the performance metrics display element 300 may display data for any past time period. For example, the performance metrics display element 300 may show data for a period of seconds, minutes, hours, on a per-shift basis, and/or on a daily, weekly, monthly, yearly, or multi-yearly basis. The time period used by the performance metrics display element 300 may be based on, for example, a predetermined configuration option and/or user input.

The performance metrics display element 300 of FIG. 3 may additionally be configured to show only data related to a particular service desk department team within a service desk department. In such an instance, only information corresponding to members of the team may be included in the table 306. Information regarding the team may additionally be displayed in the performance metrics display element 300. For example, an identifier of the team and/or of the supervisor of the team may be included in the time period area 302, or in any other region within the performance metrics display element 300. In such an instance, the team for which information is displayed in the performance metrics display element 300 may be based on, for example, a predetermined configuration option and/or user input.

Figure 4:
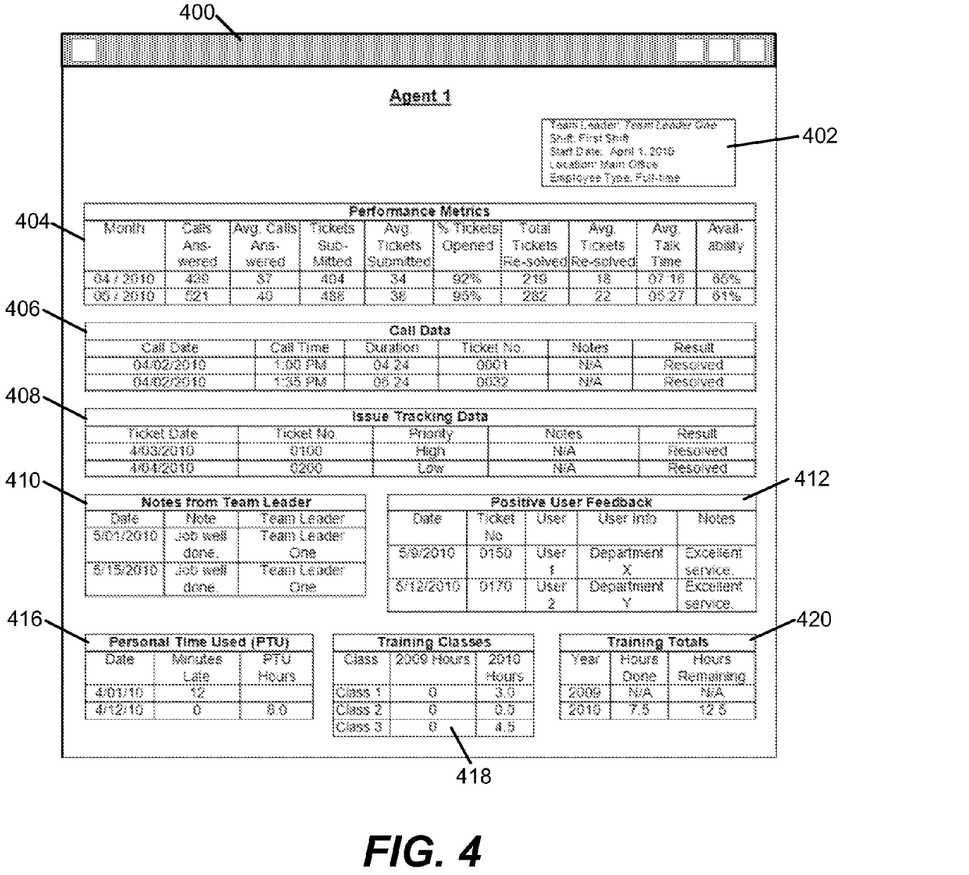
FIG. 4 shows a further performance metrics display element that includes performance metrics data related to a single agent service desk agent.

FIG. 4 shows a further performance metrics display element 400 that may be displayed by the PM client module 146 of FIG. 1. In various implementations, the PM client module 146 may obtain the data displayed in the performance metrics display element 400 from PM database 132 via the PM display data module 136, or directly from the PM database 132. The performance metrics display element 400 displays data that relates to a single agent. The performance metrics display element 400 includes an agent information area 402, a performance metrics area 404, a call data area 406, an issue tracking data area 408, a team leader notes area 410, a positive user feedback area 412, a personal time used area 416, a training classes area 418, and a training totals area 420.

The agent information area 402 shows information about the agent, such as the name of the leader of the team on which the agent works, and the location where the agent works. The performance metrics area 404 shows performance metrics related to data in both the CMS database 112 and the issue tracking system database 122. The data in the performance metrics area 404 is shown on a per-month basis for the agent.

The call data area 406 shows information related to calls that the agent has handled via the CMS 110. This information may include, for example, the time a call took place, the duration of the call, or the number of a ticket (as defined according to the issue tracking system 120) associated with the call. The issue tracking data area 408 includes information related to tickets in the issue tracking system 120 with which the agent is associated. The issue tracking area 408 may include information such as the date of a ticket, the number of a ticket, and the priority for a ticket.

The team leader notes area 410 includes information regarding notes that service desk team leaders have stored in the issue tracking system database 122 regarding the agent's performance. This information may include, for example, details regarding agent performance, behavioral items that need to be addressed with the agent, or other information. In various implementations, this information may be stored in the issue tracking system database 122, and/or in the PM database. The team leader notes area 410 may also be editable in response to user input, so that a user may edit the information and/or add additional entries regarding the agent.

The positive user feedback area 412 includes information related to tickets in the issue tracking system 120, for which the agent has received positive feedback from the user/customer. The positive user feedback area may include, for a given ticket, information such as the ticket number, the name of the user/customer, information about the user/customer such as the title of the user/customer and/or the department or organization where the user/customer works, and comments provided by the user/customer.

The personal time used area 416 includes information about personal time used by the agent. This information may be related to instances where the agent was late for work, and/or instances where the agent took scheduled vacation time. The training classes area 418 shows information related to training classes the user has taken. The training totals area 420 shows information regarding how much training the agent has completed, and may also indicate how much training the agent is required to complete for a given time calendar year or other time period.

Although not shown in FIG. 4, the performance metrics display element 400 may include additional performance metrics data related to the service desk agent, such as but limited to data related to time entry compliance for the service desk agent and survey responses related to the service desk agent. Alternatively or additionally, the performance metrics display element 400 may include one or more areas (not depicted) for displaying graphs and/or other display elements that show any or any combination of the above-mentioned performance metrics for the service desk agent over time. For example, the performance metrics display element 400 may include an area (not depicted) that includes a graph or table of calls per day and/or tickets opened per day by the service desk agent for a given time period such as a month or year. Further, performance metrics displayed in the graphs or tables may be displayed according to sub-periods. For example, a graph may display a performance metric such as calls answered per day or new tickets opened per day on a per-monthly basis for a given twelve-month period.

Figure 5:
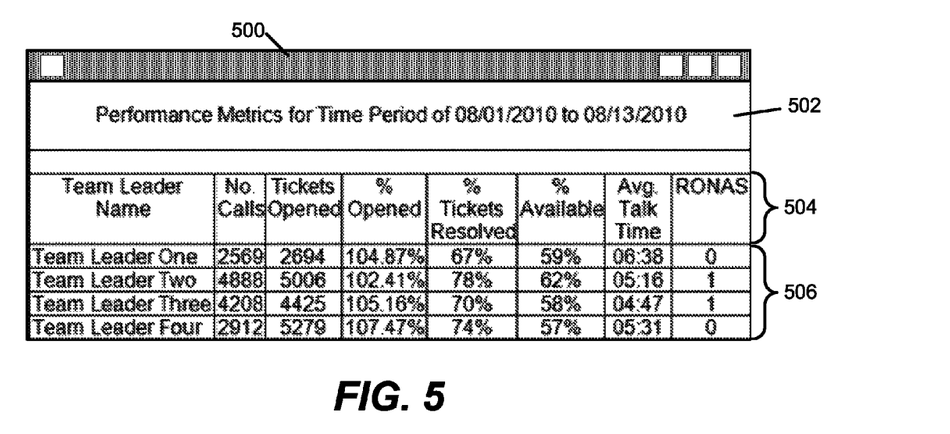
FIG. 5 shows a further performance metrics display element that includes past performance metrics data for a configured time period on a per-team basis.

FIG. 5 shows a further performance metrics display element 500 that may be displayed by the PM client module 146 of FIG. 1. In various implementations, the PM client module 146 may obtain the data displayed in the performance metrics display element 500 from the PM database 132 via the PM display data module 136, or directly from the PM database 132. The performance metrics display element 500 of FIG. 5 may be used to show past performance metrics data for a configured time period on a per-team basis. FIG. 5 shows a performance metrics display element 500 that may be displayed by the PM client module 146 of FIG. 1. As described in further detail below, the performance metrics display element 500 of FIG. 5 may be used to show past performance metrics data for a configured time period. The performance metrics display element 500 includes a time period area 502, a header row area 504, and a table area 506.

The time period area 502 indicates the time period for which performance metrics data is displayed in the performance metrics display element 500. As shown in the time period area 502, an example time period may be Aug. 1, 2010 through Aug. 13, 2010.

The table area 506 displays performance metrics related to service desk agents in a service desk department during the given time period. The header row area 504 describes the types of data that are included in the table area 506. The performance metrics shown include data related to data stored in the CMS database 112 of FIG. 1 for the given time period, such as calls answered, availability, average talk time, and RONAS. The performance metrics shown also include data related to data stored in the issue tracking system database 122 for the given time period, such as a total number of tickets opened, a percentage of calls for which a ticket was opened or updated by the service desk agent (i.e., an indication of the percentage of calls which resulted in the service desk agent opening a new ticket or updating an existing ticket), and a percentage of tickets resolved. The table area 506 displays the metrics on a per-team basis, and each row in the table area 506 corresponds to a different team within a service desk department. The data in each cell in the table area 506 is aggregated and calculated based on the service desk agents in each team. As an example, the table area 506 shows data for a team that is lead by Team Leader One. In the Tickets Opened cell that corresponds to this team, the value would be based on the number of tickets opened by all of the service desk agents for this team. The same applies, mutatis mutandis, for the other performance metrics shown in the table area 506.

Although the performance metrics display element 500 of FIG. 5 shows data for an example time period of Aug. 1, 2010 through Aug. 13, 2010, the performance metrics display element 500 may display data for any past time period. For example, the performance metrics display element 500 may show data for a period of seconds, minutes, hours, on a per-shift basis, and/or on a daily, weekly, monthly, yearly, or multi-yearly basis. The time period used by the performance metrics display element 500 may be based on, for example, a predetermined configuration option and/or user input.

As described above, the performance metrics display elements 200, 300, 400, 500 of FIGS. 2-5 display particulars combinations of service desk performance metrics data. In various implementations, each of these performance metrics display elements 200, 300, 400, 500 may show any combination of types of performance metrics data that are described above as stored in the CMS database 112, issue tracking system database 122, and/or the PM database 132, and/or that are described above as displayed in any of the other elements 200, 300, 400, 500. In particular, the combination of performance metrics data shown in any display element 200, 300, 400, 500 may be tailored according to the needs of the service desk department within which the elements 200, 300, 400, 500 are used. By way of example, the performance metrics data which are displayed in the context of the service desk department in an insurance company may be tailored for the business and regularly requirements faced by such a company.

As described above with reference to FIG. 2, the appearance of a user interface element in the first table area 210 of performance metrics display element 200 may be varied based on the level of performance indicated by the performance metric represented by the user interface element. In various implementations, the appearance of any user interface element shown in FIGS. 3-5 for displaying performance metrics data may based on the level of performance indicated by the corresponding performance metrics data, in the same or a similar fashion to that described above with respect to the first table area 210 of FIG. 2.

Figure 6:
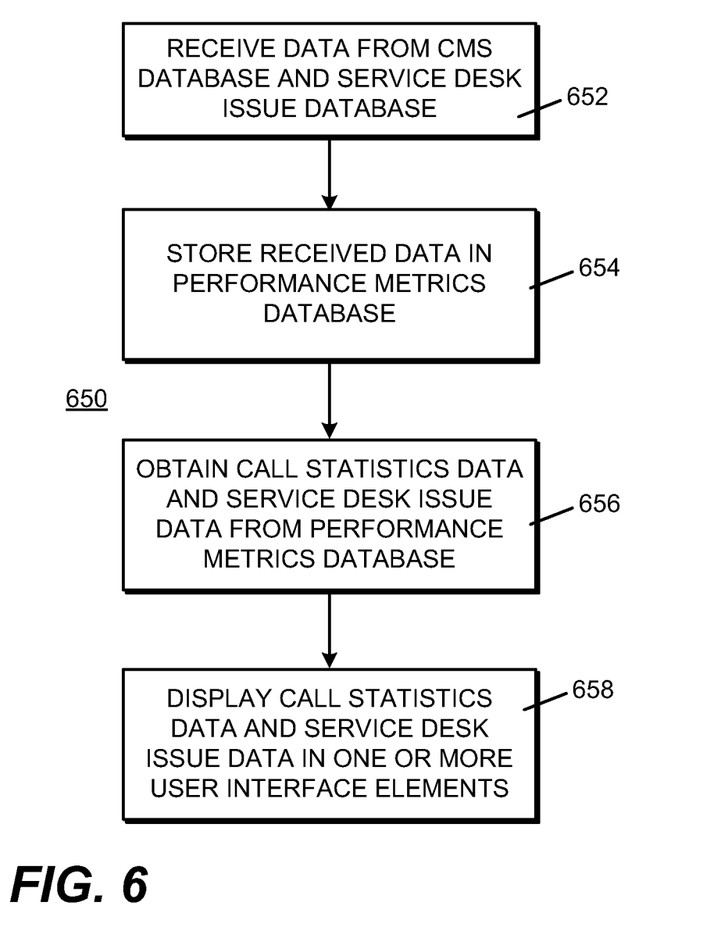
FIG. 6 shows a method for the storage, processing, and display of service desk performance metrics data for a service desk department.

FIG. 6 shows an example method 650 for the storage, processing, and display of service desk performance metrics data for a service desk department. The example method 650 of FIG. 6 may be performed using the architecture 100 of FIG. 1, or any other appropriate architecture.

As shown in FIG. 6, call statistics data may be received from a CMS database, and service desk issue data may be received from a service desk issue database (step 652). The received data may be stored in a performance metrics database (step 654). Receiving the data and/or storing the data may be performed, for example, by the PM database module 134 of FIG. 1 or other appropriate module.

Call statistics data and service desk issue data may then be obtained from the performance metrics database (step 656). This may be performed, for example, by the PM client module 146 of FIG. 1 or other appropriate module. The PM client module 146 or other appropriate module may obtain the call statistics data and service desk issue data from, for example, the PM display data module 136 or other appropriate module.

The obtained call statistics data and service desk issue data may then be displayed in one or more user interface elements (step 658). The obtained call statistics data and service desk issue data may be displayed by, for example, the PM client module 146 or other appropriate module. Each or any combination of user interface elements 200, 300, 400, 500 described above with reference to FIGS. 2-5 and/or any other appropriate display elements may be used to display the obtained data.

Figure 7:
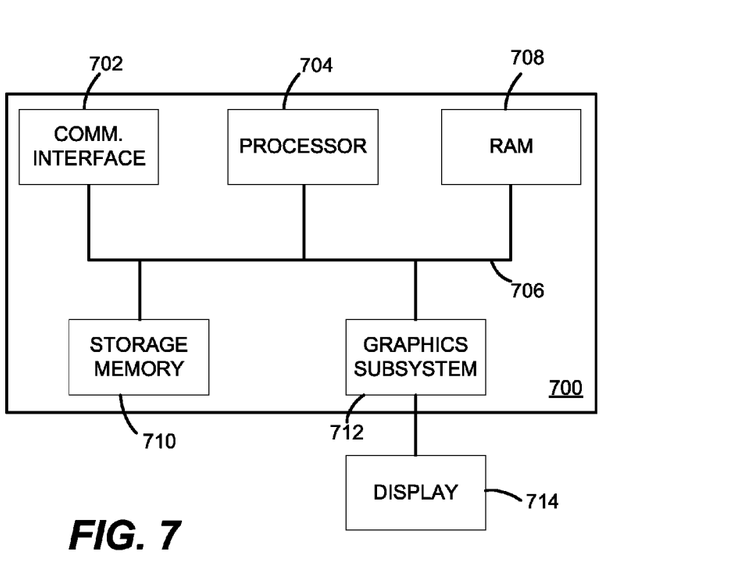
FIG. 7 shows a computing device that may be used to implement the features described herein with reference to FIGS. 1-6.

FIG. 7 shows an example computing device 700 that is configurable to implement features described above with reference to FIGS. 1-6. The computing device 700 may include a processor 704, a communications interface 702, RAM 708, storage memory 710, graphics subsystem 712, display device 714, and system bus 706. The components 702, 704, 708, 710, 712, and 714 may be operatively coupled via the system bus 706.

The processor 704 may be configurable to store and read data from registers and execute instructions that perform any feature or combination of features described above with reference to FIGS. 1-6. The computing device 700 may also include one or more additional processors (not depicted) which may be operatively coupled to the other components 702, 704, 708, 710, 712, and 714 in the computing device 700 via the system bus 706.

The computing device 700 may receive input data through communications interface 702. The communications interface 702 may be, for example, a communications port, a wired or wireless transceiver or network interface, or an interface such as a Universal Serial Bus (USB) interface for receiving input from a user (not depicted) or an external computer-readable medium (not depicted). The computing device 700 may include additional data interfaces (not depicted). The storage memory 710 may be, for example, a hard disk drive, flash memory, or device capable of reading data from at least one non-volatile computer-readable medium. The RAM 708, the storage memory 710, and/or other computer-readable media (not depicted) within computing device 700 may be configurable to store instructions and/or data related to the implementation of any feature or combination of features described above with reference to FIGS. 1-5.

The graphics subsystem 712 is configurable to generate graphics data to display graphics such as the graphics described above with reference to FIGS. 1-6. Display device 714 is capable of rendering the data sent from the graphics subsystem 712 in a visual format. The display device 714 may be, for example, a monitor or television display, a plasma display, a liquid crystal display (LCD), or a display based on technologies such as front or rear projection, light emitting diodes (LEDs), organic light-emitting diodes (OLEDs), or Digital Light Processing (DLP). The display device 714 may be included within an external casing that encloses the computing device 700, or may be implemented externally to the computing device 700 and coupled to the computing device 700 via one or more wired or wireless interfaces.

As used herein, the term "processor" broadly refers to and is not limited to a single- or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine. When referred to herein, the term "computer-readable storage medium" broadly refers to and is not limited to a register, a cache memory, a read-only memory (ROM), a semiconductor memory device (such as a Dynamic Random Access Memory (D-RAM), Static RAM (S-RAM), or other RAM, a magnetic medium such as a flash memory, a hard disk, a magneto-optical medium, an optical medium such as a CD-ROM, a digital versatile disk (DVDs), or Blu-Ray disc (BD), other volatile or non-volatile memory, or other type of device for electronic data storage.

As used herein, the term "display device" broadly refers to and is not limited to a monitor or television display, a plasma display, a liquid crystal display (LCD), or a display based on technologies such as front or rear projection, light emitting diodes (LEDs), organic light-emitting diodes (OLEDs), or Digital Light Processing (DLP). When referred to hereafter, the term "input device" broadly refers to and is not limited to a keyboard, a mouse, a trackball, a scanner, a touch screen, a touch pad, a stylus pad, and/or other device that generates electronic signals based on interactions with a human user. Input devices may operate using technologies such as Bluetooth, Universal Serial Bus (USB), PS/2, or other technologies for data transmission.

As used herein, the term "database" broadly refers to and is not limited to a flat file, spreadsheet, structured file, relational database file, or any other form of organized data stored on a computer-readable storage medium. As used herein, the terms "user interface element" and "display element" broadly refer to and are not limited to a window, icon, text box, menu, graphical button, list, region, area, widget, visual artifact, or other construct that may be displayed in a user interface on a display device. A user interface element/display element may include other user interface elements/display elements.

Although features and elements are described above in particular combinations, each feature or element can be used alone without the other features and elements or in various combinations with or without other features and elements. The sub-elements of the methods and features as described above with respect to FIGS. 1-7 may be realized in any order (including concurrently), in any combination or sub-combination. Sub-elements described with reference to any single Figure may be used in combination with the sub-elements described with reference to any other Figure or combination of other Figures.

What is claimed is:

1. A system for monitoring the performance of a plurality of agents, the system comprising:

at least one communications interface configured to receive information regarding each of the plurality of agents related to both inward and outward looking services based on measurable values, wherein the measurable values are related to one or more systems for submitting insurance claims, processing insurance claims, performing stack trades, maintaining compliance with insurance laws, and maintaining compliance with Securities and Exchange (SEC) regulations;

at least one database to store the received information for subsequent access by a processor;

at least one processor configured to:
   group the plurality of agents into at least two teams of agents;
   calculate a performance metric for each of the plurality of agents based on the measured values including call statistic data and call service data;
   calculate a performance metric for each of the at least two teams of agents; and
   store the calculated performance metrics for each of the plurality of agents and for each of the at least two teams of agents; and a display device configured to display user interface elements, wherein the user interface elements include the stored performance metrics of the plurality of agents and the at least two teams of agents.

2. The system of claim 1 wherein the plurality of agents are grouped into the at least two teams of agents based on the team leader of the plurality of agents.

3. The system of claim 1 wherein the user interface elements indicate for each of the plurality of agents and for the at least two teams of agents whether the performance metrics is indicative of an acceptable level of performance.

4. The system of claim 1 wherein outward looking services include a call center.

5. The system of claim 1 wherein the information for outward looking services includes call statistics from a call management system (CMS).

6. The system of claim 1 wherein the outward looking services include data for each of the plurality of agents over a given period of time.

7. The system of claim 1 wherein the inward looking services include a service desk.

8. The system of claim 1 wherein the information for inward looking services includes issue tracking.

9. The system of claim 1 wherein the inward looking services include data for each of the plurality of agents over a given period of time.

10. The system of claim 1 wherein measurable values include an average number of calls answered per hour and average number of tickets resolved per hour.

11. The system of claim 1 wherein the inward and outward looking services are equally weighted in the performance metric.

12. A method for monitoring the performance of a plurality of agents, the method comprising:

receiving information via at least one communication interface regarding each of the plurality of agents related to both inward and outward looking services based on measurable values, wherein the measurable values are related to one or more systems for submitting insurance claims, processing insurance claims, performing stack trades, maintaining compliance with insurance laws, and maintaining compliance with federal regulations;

storing the received information in at least one database for subsequent access by a processor;

grouping, via a processor, the plurality of agents into at least two teams of agents;
calculating, via a processor, a performance metric for each of the plurality of agents based on the measured values including call statistic data and call service data;
calculating, via a processor, a performance metric for each of the at least two teams of agents;
storing the calculated performance metrics for each of the plurality of agents and for each of the at least two teams of agents; and
displaying user interface elements, on a display device, wherein the user interface elements include the stored performance metrics of the plurality of agents and the at least two teams of agents.

13. The method of claim 12 wherein the plurality of agents are grouped into the at least two teams of agents based on the team leader of the plurality of agents.

14. The method of claim 12 wherein the user interface elements indicate for each of the plurality of agents and for the at least two teams of agents whether the performance metrics is indicative of an acceptable level of performance.

15. The method of claim 12 wherein measurable values include an average number of calls answered per hour and average number of tickets resolved per hour.

16. The method of claim 12 wherein inward and outward looking services are equally weighted in the performance metric.

17. A non-transitory computer-readable medium having processor executable instructions stored thereon which, when executed by at least one processor, will cause the at least one processor to perform a method for monitoring the performance of a plurality of agents, the method comprising:
receiving information via at least one communication interface regarding each of the plurality of agents related to both inward and outward looking services based on measurable values, wherein the measurable values being related to one or more systems related to submitting insurance claims, processing insurance claims, performing stack trades, maintaining compliance with insurance laws, and maintaining compliance with Securities and Exchange (SEC) regulations;
storing the received information in at least one database for subsequent access by a processor;
grouping, via a processor, the plurality of agents into at least two teams of agents;
calculating, via a processor, performance metrics for each of the plurality of agents based on the measured values including call statistic data and call service data;
calculating, via a processor, a performance metric for each of the at least two teams of agents; storing the calculated performance metrics for each of the plurality of agents and for each of the at least two teams of agents; and
displaying user interface elements, wherein the user interface elements include the stored performance metrics of the plurality of agents and the at least two teams of agents.

18. The computer-readable medium of claim 17 wherein the plurality of agents are grouped into the at least two teams of agents based on the team leader of the plurality of agents.

19. The computer-readable medium of claim 17 wherein the user interface elements indicate for each of the plurality of agents and for the at least two teams of agents whether the performance metrics is indicative of an acceptable level of performance.

20. The computer-readable medium of claim 17 wherein measurable values include an average number of calls answered per hour and average number of tickets resolved per hour.

* * * * *